Nov. 16, 1971   R. J. WADDELL ET AL   3,620,041
RESLEEVE ASSEMBLY FOR SHAFTS
Filed Sept. 11, 1969                    2 Sheets-Sheet 1
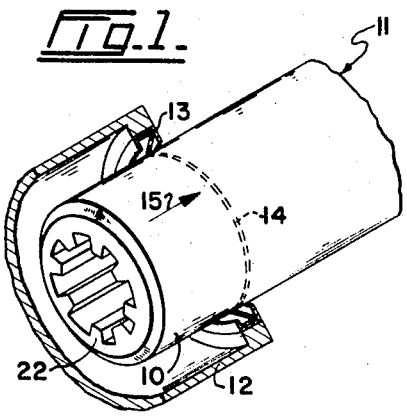
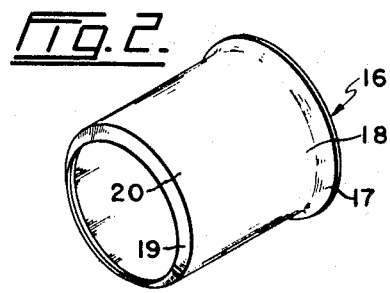
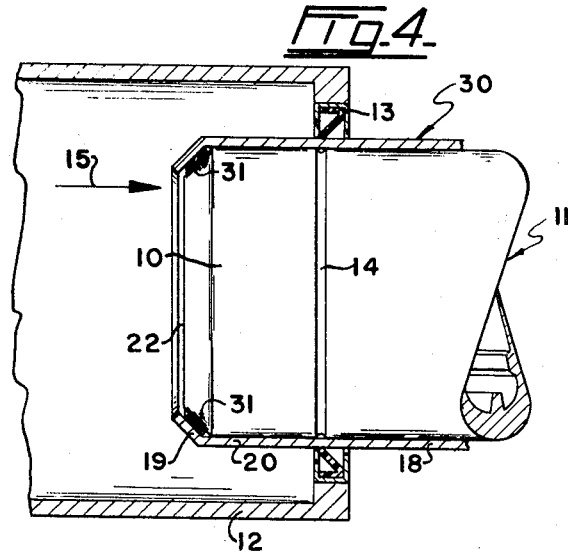
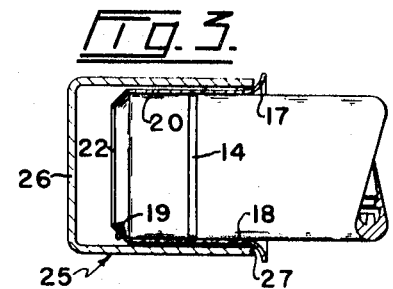
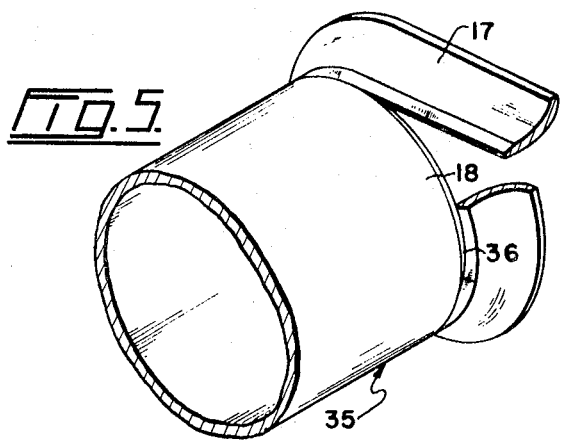
INVENTORS
KARL W. EGGLER
RAYNOR J. WADDELL
BY
Featherstonhaugh & Co.
ATTORNEYS

# United States Patent Office 3,620,041
Patented Nov. 16, 1971

3,620,041
RESLEEVE ASSEMBLY FOR SHAFTS
Raynor J. Waddell, 2987 Pinnacle St., Port Coquitlam, Vancouver, British Columbia, Canada, and Karl W. Eggler, 6466 Deer Lake Drive, Burnaby, Vancouver, British Columbia, Canada
Continuation-in-part of application Ser. No. 673,832, Oct. 9, 1967. This application Sept. 11, 1969, Ser. No. 871,444
Int. Cl. F16c 1/00
U.S. Cl. 64—1
16 Claims

ABSTRACT OF THE DISCLOSURE

A thin walled metallic sleeve provided with an exterior flange at one end to which a tool may be applied for drawing the sleeve over an end portion of the shaft to be resleeved, the sleeve having interior shaft engaging means at its other end for engaging the end of the shaft and preventing movement of the sleeve therealong, the sleeve very slightly smaller in diameter than the end portion of the shaft so that it does not rotate thereon.

CROSS REFERENCE TO RELATED APPLICATION

This application is a continuation-in-part of application Ser. No. 673,832 entitled "Resleeve Assembly for Shafts," filed Oct. 9, 1967, now abandoned.

BACKGROUND OF THE INVENTION

This invention relates to resleeving of all sealed surfaces on rotating shafts and in particular resleeving drive line yokes and companion flanges, crank shaft flanges; and crank shaft seal surface areas in the automotive field.

Wear of oil sealed surfaces on rotating shafts is an inevitable occurence with existing types of sealing material and can only be cured by either replacing the worn parts or by resleeving the shafts. The resleeving procedure is usually carried out by machining off the worn area, making up a sleeve to fit, and driving or pressing this thick walled sleeve over the worn portion of the shaft then turning the sleeve on a lathe to provide a true cylindrical surface of original dimension. This procedure is not entirely successful as, unless the worn shaft sealed surface is machined down to close dimension tolerance, any sleeve thrust thereover will permit the seepage of oil between the mating metallic surfaces.

It is sometimes the practice to press-fit a thick-walled sleeve over the worn end portion of the shaft, however, this also can result in oil leakage between mating metallic surfaces, and distortion or collapse of the sleeve. Furthermore, as the original diameter of the shaft is greatly increased, the original oil seals must be replaced with oversize, non-standard seals.

SUMMARY OF THE INVENTION

In accordance with the present invention, there is provided a thin wall stainless steel sleeve having an exterior flange at one end to which a tool may be applied to pull the sleeve over the end of the shaft to be resleeved, said sleeve having an interior flange or lip at its other end, engageable with the end of the shaft when the sleeve is drawn thereover. The diameter of the sleeve is slightly less than the diameter of the shaft so as to have a tight non-rotatable fit thereon. Sealing means such as for example a resilient annular sealing member fitting the sleeve interiorly thereof may be provided between the sleeve and the shaft to effect an oil tight seal.

The present invention also includes a circumferentially extending score line formed in the sleeve adjacent to the exteriorly extending annular flange for permitting removal of the latter when certain applications make this a desirable or imperative condition.

BRIEF DESCRIPTION OF THE DRAWINGS

FIG. 1 is an isometric view of the end of a shaft to be resleeved, showing a worn portion thereon, FIG. 2 is an isometric view of one embodiment of the invention, FIG. 3 is a central sectional view showing a sleeve in position on a shaft, together with an installing tool on the shaft, FIG. 4 is an enlarged sectional view of one end of another embodiment of the invention, and FIG. 5 is an isometric view of a portion of yet another embodiment of the invention.

DESCRIPTION OF THE PREFERRED EMBODIMENTS

Figure 6:
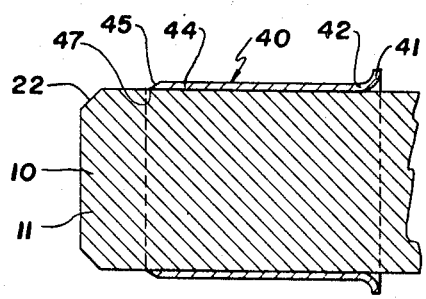
FIG. 6 is a central sectional view of another embodiment of the invention.

Referring to the drawing and particularly to FIG. 1 thereof, there is illustrated one end portion 10 of a shaft 11. Said shaft may be the end of a crankshaft or the hub of a drive line yoke fitted in a casing 12, partially shown, and operates in a bath of oil, the end portion 10 projecting into the casing and being sealed by the conventional seal 13 which is usually formed of material, such as rawhide or a suitable synthetic material and which is secured in a known conventional manner to the casing 12 in which the shaft is housed.

After prolonged operation, due to the relative tight oil seal engagement of the seal 13 with the shaft, the latter wears slightly (the area of wear being illustrated by the dash lines 14) permitting oil to seep through between the end portion 10 of the shaft and the seal, in the direction indicated by the arrow 15.

It has been the practice to resleeve the end portion 10 by machining it down and driving or press-fitting a thick-walled metallic sleeve thereover, then machining the sleeve back to the original cylindrical surface or by press-fitting a thick-walled sleeve over the worn portion of the shaft which results in a sealing surface of a larger diameter than the original sealing surface which consequently requires the replacement of the original seals with non-standard seals of large diameter.

Furthermore, as there is a metal to metal mating of the shaft and sleeve, a tight oilproof fit is rarely attainable.

FIG. 2 illustrates one embodiment 16 of the sleeve of the invention. Sleeve 16 is formed of a length of thin-walled seamless metallic tubing having an inside diameter slightly less than the diameter of the end portion 10 of the shaft to be resleeved. The sleeve is preferably formed of stainless steel and with 3-inch shaft, the thickness of the sleeve material is approximately $19/1000$ of an inch and the diameter of the sleeve is between $2/1000$ and $7/1000$ inches less than the diameter of the shaft.

The sleeve 16 is provided with an exteriorly extending annular flange 17 at one end 18 and with an interiorly extending annular flange 19 or other abutment means at its opposite end 20. Both flanges 17 and 19 are formed by conventional processes such as stamping or turning. Flange 17 may extend at an obtuse angle to the sleeve proper, as illustrated, or may be bent backwardly to form a U-shape seat. As the ends of most shafts are chamfered, as illustrated in FIG. 1 and accorded the numeral 22, the flange 19 is formed so that it extends inwardly at an angle compatible with the angle of chamfer.

In applying the sleeve 16 to the end portion 10 of the shaft, an installing tool 25 (see FIG. 3) is employed.

This installing tool comprises a length of thick-walled metallic tubing having an inside diameter a little greater than the outside diameter of the sleeve so as to have a loose slidable fit thereover. One end 26 of the tool is closed and its other end 27 is open and the tool is a little longer interiorly than the sleeve.

In applying the sleeve to the shaft, said sleeve is first fitted in the tool, end 20 foremost, and the flanged end 18 then applied to the chamfered end 22 of the shaft. The closed end 26 of the tool is struck with a maul or hammer thereby pulling the sleeve over the end portion of the shaft 12 until the flange 19 engages the chamfered end 22 of the shaft.

As the diameter of the sleeve is a little less than the diameter of the shaft, a tight stretch-fit of the sleeve relative to the shaft will be obtained. However, the sleeve will not be distorted as it is drawn or pulled over the end portion 10 of the shaft rather than being pushed thereover.

It will be understood that the length of the sleeve is such that the worn end portion 10 of the shaft is completely covered by the sleeve forming a new oil-seal surface.

If the original oil-seal surface of the end portion of the shaft is in good dimensional condition, due to the stretch fit of the seal sleeve thereover, an oil-tight metal to metal contact will be obtained. Furthermore, as the sleeve is of extremely thin material, it will not be necessary to use oversize non-standard oil seals as seals of this type are sufficiently expansible to accommodate minor diametrical variations of the shafts or hubs to be sealed.

FIG. 4 illustrates a portion of another embodiment 30 of the sleeve of the invention with a portion of a shaft to be sealed shown in conjunction therewith.

Sleeve 30 is identical in most respects to sleeve 16, consequently similar parts of sleeve 30 have been accorded the same numerals as their counterparts of sleeve 16. Sleeve 30 is employed where it is impossible to obtain a perfect metal to metal oil tight seal of the sleeve and the shaft due to poor dimensional condition of the shaft or when it has been heavily scored. Sleeve 30 is therefore provided with an annular sealing element 31 such as an O-ring formed of rubber or any suitable synthetic material, which fits interiorly of the sleeve 30 against the flange 19. When the sleeve 30 is driven over the end portion 10 of the shaft, the sealing element 31 will be pressed between the flange 19 and said chamfered end 22 of the shaft thereby creating an oil-tight seal. The sealing element 31 may be separable relative to the sleeve 30, however, it is preferred that it be bonded thereto by any suitable means.

In FIG. 5 there is illustrated a portion of yet another embodiment 35 of the sleeve of the invention. Sleeve 35 like sleeve 30 is almost identical to sleeve 16 and accordingly identical parts of sleeve 35 will be accorded the same numerology as corresponding parts of sleeve 16.

Sleeve 35 is formed having a circumferentially extending score line 36 formed therearound adjacent the flange 17 so as to permit the latter to be stripped from the sleeve proper after the latter is installed. In order to remove the flange 17 all that is necessary is to sever the latter, then with the use of a pair of pliers or a suitable slotted key, not shown, the flange rolled or pelled away. Sleeve 35 is used where in certain cases the shaft or hub to which the sleeve 35 is applied does not permit the retention of an extending flange which will interfere with the installation of bearings and the like.

As sleeves 16, 30 and 35 are all applied in the same manner to shafts, hubs, companion flanges and the like, which are classed as shafts for the purposes of this application, it will be appercciated that in some instances, where circumstances permit, their application will not necessitate the dismantling or removal of the part to which they are to be applied, as in every case a true oil seal surface is obtained upon their installation without the need for any further work. This greatly reduces installation costs and down time of the equipment being repaired.

Figure 7:
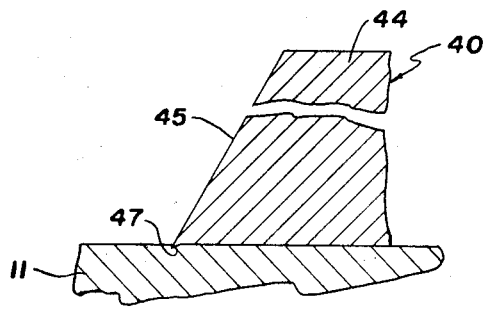
FIG. 7 is an enlarged partial view of the embodiment in FIG. 6.

FIGS. 6 and 7 illustrate yet another embodiment 40 of the sleeve of the invention. Sleeve 40 is formed in much the same manner as sleeve 16 being preferably formed of a length of thin-walled seamless metallic tubing having an exteriorly extending flange 41 at one end 42 which is identical to flange 17 of sleeve 16 and serves the same purpose as the latter. Sleeve 40, however, differs from sleeve 16 in that it has no annular flange corresponding to annular flange 19 at its other end 44. The end 44 of sleeve 40 is bevelled as at 45 and has its end slightly turned inwardly to form a circumferentially extending sharp lip 47.

Sleeve 40 is applied in somewhat the same manner as sleeve 16 by fitting a driving tool thereover against flange 41 and driving it over the end portion 10 of the shaft 11 until the sharp lip 47 rides up over the chamfered end 22 and on to the cylindrical surface of the shaft. The sharp lip 47, if the sleeve is formed of a harder material than the shaft, will bite into the latter, slightly, and prevent withdrawal of the sleeve.

In order to provide an effective oil seal between the sleeve 40 and shaft 11, a cement such as an epoxy cement may first be spread around the interior of the sleeve prior to its application to the shaft. When the cement is set it will not only provide an oil seal as aforesaid but prevent movement of the sleeve relative to the shaft.

Unlike sleeve 16 and sleeves 30 and 35 which are located on the shaft by the engagement of their interior flanges 19 with the chamfered end 22 of the shaft, sleeve 40 may be positioned anywhere therealong to suit the position of the seal 13. As the length of sleeve 40 is, therefore, not determined by the distance between the chamfered end 22 of the shaft and the seal 13, the necessity for producing sleeves of varied lengths to suit varied lengths of shafts, as is the case with sleeves 16, 30, and 35, is eliminated.

What is claimed is:

1. Shaft resleeve apparatus comprising an elongated, thin-walled, cylindrical, metallic sleeve, exterior abutment means at one end of the sleeve engageable by a tool for drawing the sleeve over an oil seal end portion of a shaft to be resleeved, interior abutment means at the other end of the sleeve engageable with the shaft end over which the sleeve is drawn, said sleeve being slightly smaller in diameter than the said end portion of the shaft so as to have a tight, non-rotatable fit thereon, and including annular resilient sealing means fitting interiorly of the sleeve adapted to be compressed between the interior abutment means and said end of the shaft when the sleeve is applied to the shaft.

2. Shaft resleeving apparatus comprising an elongated, thin-walled, cylindrical, metallic sleeve having an outwardly extending flange at one end engageable by a tool for drawing the sleeve over an oil seal end portion of a shaft to be resleeved, an inwardly extending flange at the other end of the sleeve adapted to engage the end of the shaft over which the sleeve is drawn, said sleeve having an inside diameter slightly smaller than the diameter of said end portion of said shaft so as to have a tight, non-rotatable fit thereon, and including an annular resilient sealing member bonded to the inwardly extending flange interiorly of the sleeve adapted to be moved into compressive sealable engagement with said end of the shaft when the sleeve is applied to the latter.

3. Shaft resleeving apparatus comprising an elongated, thin-walled, cylindrical, metallic sleeve, exterior abutment means at one end of the sleeve engageable by a tool for drawing the sleeve over an oil seal end portion of a shaft to be resleeved, shaft engaging means at the other end of the sleeve engageable with the shaft to prevent movement of the sleeve therealong after the sleeve is fitted thereon, said sleeve having an inside diameter slightly smaller than the diameter of said end portion of the shaft so as to have a tight, nonrotatable fit thereon, said shaft engaging means comprising an interiorly extending circumferential flange engageable with the end of the shaft over which the sleeve is drawn, and including annular resilient sealing means fitting interiorly of the sleeve adapted to be moved into compressive sealable engagement with said end of the shaft when the sleeve is applied to the latter.

4. Shaft resleeving apparatus comprising an elongated thin-walled, cylindrical metallic sleeve having an outwardly extending flange at one end engageable by a tool for drawing the sleeve over an oil seal end portion of a shaft to be resleeved, said sleeve having an inside diameter slightly smaller than the diameter of said end portion of said shaft so as to have a tight, non-rotatable fit thereon, said sleeve having a circumferentially extending scoreline formed therein adjacent the outwardly extending flange to permit separation of the latter from the sleeve proper.

5. Shaft resleeve apparatus comprising an elongated thin-walled, cylindrical, metallic sleeve, exterior abutment means at one end of the sleeve engageable by a tool for drawing the sleeve over an oil seal end portion of the shaft to be resleeved, said sleeve being approximately 0.010 in thickness and having an interior diameter slightly smaller than the diameter of said end portion of the shaft so as to have a tight, non-rotatable fit thereon, whereby to permit restoration and resealing of the oil seal end portion without necessitating use of an oversize seal relative to the standard original seal.

6. Apparatus as claimed in claim 5 further comprising shaft engaging means at the other end of the sleeve engageable with the shaft to prevent movement of the sleeve therealong after the sleeve is fitted thereon.

7. Apparatus as claimed in claim 6 wherein said shaft engaging means comprises an interiorly extending circumferential flange engageable with the end of the shaft over which the sleeve is drawn.

8. Apparatus as claimed in claim 6 wherein said shaft engaging means comprises a sharp, interiorly extending, circumferential lip for gripping the surface of the end portion of the shaft when the sleeve is drawn thereover.

9. Resleeving apparatus as claimed in claim 5, in which the interior diameter of the sleeve is between 0.002 and 0.007 inch less than the diameter of the end portion of the shaft to be resleeved.

10. Apparatus as claimed in claim 3, in which the shaft engaging means comprises a sharp, interiorly extending, circumferential lip for gripping the end portion of the shaft when the sleeve is drawn thereover.

11. Apparatus as claimed in claim 3, including cementitious sealing means between the shaft and sleeve, said cementitious sealing means being applied before the sleeve is applied to the shaft.

12. Apparatus as claimed in claim 3, in which the exterior abutment means comprises an exteriorly extending, circumferential flange.

13. Apparatus as claimed in claim 10, in which the sleeve is formed of stainless steel approximately 0.010 inch in thickness.

14. Apparatus as claimed in claim 10, in which the interior diameter of the sleeve is between 0.002 and 0.007 inch less than the diameter of the end portion of the shaft to be resleeved.

15. Apparatus as claimed in claim 3, in which the sleeve is formed of a stainless steel of approximately 0.010 inch in thickness.

16. Apparatus as claimed in claim 3, in which the sleeve has a circumferentially extending scoreline formed therein adjacent the exterior abutment means to permit separation of the latter from the remainder of the sleeve.

References Cited
UNITED STATES PATENTS

| | | | |
|---|---|---|---|
| 826,841 | 7/1906 | France | 64—1 |
| 2,197,883 | 4/1940 | Sinclair | 64—1 |
| 2,821,010 | 1/1958 | Vasconi et al. | 29—149.5 |
| 3,419,949 | 1/1969 | Huebner | 29—149.5 |

BENJAMIN W. WYCHE, Primary Examiner

R. HEALD, Assistant Examiner